UNITED STATES PATENT OFFICE.

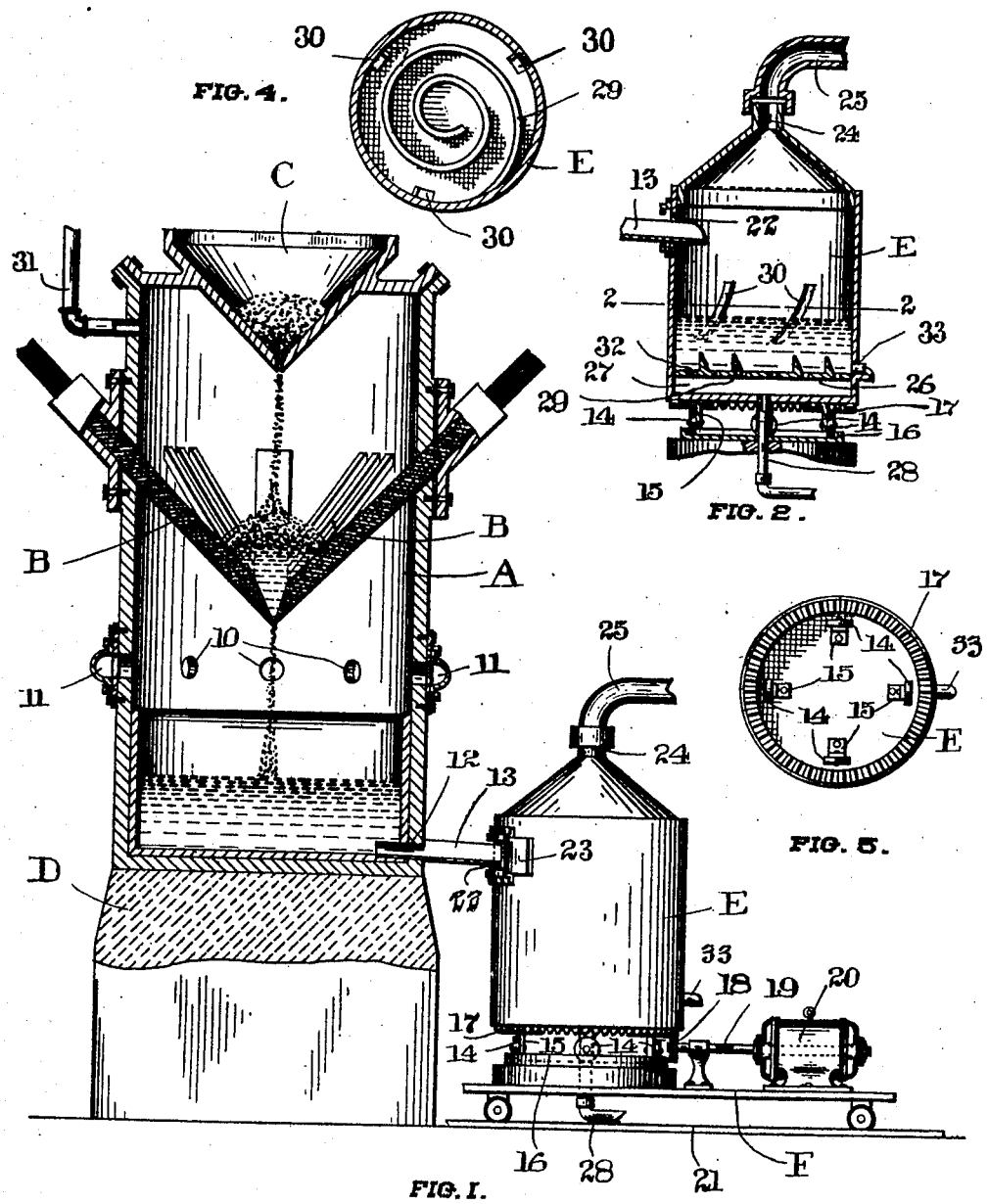

JAMES HENRY REID, OF NEWARK, NEW JERSEY.

PROCESS FOR REFINING METAL.

No. 920,391.

Specification of Letters Patent.

Patented May 4, 1909.

Application filed November 11, 1908. Serial No. 462,167.

*To all whom it may concern:*

Be it known that I, JAMES HENRY REID, of Newark, in the State of New Jersey, United States of America, have invented certain new and useful Improvements in Processes for Refining Metal, of which the following is a specification.

My invention relates to improvements in processes of refining metal, particularly iron, and the objects of my invention are to provide a simple, cheap and effective process by means of which steel or other refined forms of iron may be produced in a continuous process from the ore itself.

In an earlier application, Serial No. 452,231, I have described a method of treating metals by gas sucked through the same, and the present process may be conveniently carried out as a continuation of this earlier process, although, as will hereinafter appear, it might be readily carried out independently of it.

In carrying out the invention the iron ore is melted by electric heat and mixed with a reagent, such as carbon or carbon monoxid gas, which will reduce the same and result in the production of carbon monoxid or carbon dioxid gas. The frothy mass of gas and partly reduced ore is then placed in a converter which is rotated, and while rotating the surface is exhausted and if desired, further reducing gas is forced through the metal. This completes the reduction of the iron oxid and the separation of the gas therefrom, leaving as a resultant product, refined iron or steel which may have any suitable hardening substances, such as nickel or chromium mixed therewith, as hereinafter described.

In the drawings, Figure 1 is an elevation partially in section of an apparatus used to carry out the process. Fig. 2 is a vertical section through the converter. Fig. 3 is a plan of the bottom of the converter. Fig. 4 is a section on the line 2—2, Fig. 2.

In the drawings, like characters of reference indicate corresponding parts in each figure.

Referring to the drawings, A represents the body of the furnace, with electrodes B, hopper C and base D, the construction of the furnace being substantially that shown and illustrated in my aforesaid earlier application.

10 represents a plurality of apertures provided in the walls of the furnace below the electrodes, through which a gaseous reagent may be introduced, the said reagent being fed to the openings through the conduit 11.

12 represents the tap hole at the bottom of the furnace, which communicates with a trough 13 and E represents a rotary converter, which is adapted to rotate about a vertical axis, this being accomplished in the embodiment illustrated, by providing a plurality of wheels 14 supported from brackets 15 in the bottom of the converter and running on an annular track 16, the converter being rotated through the medium of an annular gear 17 on the bottom engaged by a driving pinion 18, which may be attached directly to the shaft 19, of an electric motor 20, the converter and motor being preferably supported on a truck F running on tracks 21, whereby it may be moved to and from the furnace.

An aperture 22 is provided in one side of the converter, near the top, adapted to be closed by a door 23 and an outlet 24 is provided at the top of the converter, having swiveling connection with a conduit 25, by means of which the surface of the metal in the converter may be exhausted. The converter is also provided with a false bottom 26 below which a gas chamber 27 is formed, communicating with the supply pipe 28 by means of which gas may be introduced, under pressure, the said gas chamber 27 communicating with the interior of the converter through a plurality of small apertures 32.

To assist the agitation of the metal in the converter, a spiral vane 29 is formed on the bottom and a plurality of inclined vanes 30 are provided on the sides.

In carrying out the process in the apparatus just described, the ore to be treated, which, for illustration, I will assume is iron oxid, $Fe_3O_4$, is fed into the hopper C. It then drops on to the crucible formed by the converging electrodes B and is melted by the action of the electric current, the carbon of the electrodes effecting a partial reduction of the ore. At the same time, a reducing gas, such as carbon monoxid is introduced through the apertures 10 being drawn about the ore by suction exerted through a suitable exhaust pipe 31 entering the top of the furnace. This carbon monoxid gas, during the melting of the ore, will take oxygen from the same, resulting in the collection of a frothy mass of partially reduced ore, together with carbon monoxid and carbon dioxid, collecting in the bottom of the furnace. This is then run off through the trough 13 into the converter E. The converter is then withdrawn a short distance from the furnace and rapidly rotated, the surface thereof, at the same time, being exhausted through the pipe 25. This will result in an intimate mixture of any carbon monoxid gas in the mass with the iron oxid. This will reduce the oxid, leaving carbon dioxid gas which will be drawn off through the pipe 25.

If the carbon monoxid gas carried with the ore into the converter, is insufficient to reduce the same, a further quantity may be introduced by pressure through the pipe 28 and false bottom 26.

It will be evident that if nickel or chromium steel is desired, these elements may be introduced to mix with the molten metal therein. At the end of the process, the final product may be withdrawn through the tap hole 33.

As many changes could be made in the above construction, and many apparently widely different embodiments of my invention, within the scope of the claims, could be made without departing from the spirit or scope thereof, it is intended that all matter contained in these specifications and drawings, shall be interpreted as illustrative and not in a limiting sense.

What I claim as my invention is:—

1. The herein described process of reducing and refining metal ore which consists in first melting the ore, then mixing the same with carbon monoxid gas to produce a frothy mass of gas and ore, and then rotating said mass and exhausting the surface thereof.

2. The herein described process of reducing and refining metal ore which consists in first melting the ore, then mixing the same with a reducing gas to produce a frothy mass of gas and ore, and then rotating said mass and exhausting the surface thereof.

In witness whereof I have hereunto set my hand in the presence of two witnesses.

JAMES HENRY REID.

Witnesses:
  RUSSEL S. SMART,
  M. GILBERTSON.